United States Patent [19]

Minder et al.

[11] Patent Number: 5,554,446
[45] Date of Patent: Sep. 10, 1996

[54] COATED MATERIAL, THE PREPARATION OF USE THEREOF

[75] Inventors: Ernst Minder, Sissach, Switzerland; Walther Hofherr, Kirchzarten-Zarten, Germany

[73] Assignee: Ciba-Geigy Corporation, Tarrytown, N.Y.

[21] Appl. No.: 389,365

[22] Filed: Feb. 16, 1995

Related U.S. Application Data

[62] Division of Ser. No. 89,137, Jul. 9, 1993, Pat. No. 5,413,860.

[30] Foreign Application Priority Data

Jul. 15, 1992 [CH] Switzerland ............................ 2227/92

[51] Int. Cl.$^6$ ...................................................... B32B 9/00
[52] U.S. Cl. ...................... 428/411.1; 252/500; 361/524
[58] Field of Search ........................ 428/411.1; 252/500; 361/524

[56] References Cited

U.S. PATENT DOCUMENTS

| 3,634,336 | 1/1972 | Perez-Albuerne | 252/519 |
| 4,384,025 | 5/1983 | Hilti et al. | 428/411 |
| 4,522,754 | 6/1985 | Hilti et al. | 260/239 R |
| 5,009,812 | 4/1991 | Finter et al. | 252/500 |

FOREIGN PATENT DOCUMENTS

| 224207 | 6/1987 | European Pat. Off. . |
| 340421 | 11/1989 | European Pat. Off. . |
| 447603 | 9/1991 | European Pat. Off. . |

OTHER PUBLICATIONS

T. Ohsawa et al. Jap. Journal of Applied Phys. vol. 30 (11B) pp. 1953–54 (1991).
E. Conwoe, Semiconductors and Semimetals, vol. 27 pp. 30–85 (1990).
Microelec. Manuf. and Testing, Spin on Glass for dielectric Planarization, Lake Publ. Corp. pp. 1–5 (1989).
Derw. Abst. 92–229907 of JP 4,153,282.
Patent Absts. of Japan vol. 015219 of JP 3062433.
Derw. Abst. 76–10676x of SU 464 550.
Patent Absts of Japan—vol. 016437 of JP 4,153,282.
Derw. Abst. 93–004703 of JP 4,332,770.
Patent Absts of Japan vol. 017176 of JP 4332770.
Derw. Abst 91–358664 of JP 3241307.
Patent Absts of Japan vol. 016028 of JP 3241307.
JP 4,332,770 by Hitachi Chem. Co. Ltd.

Primary Examiner—Patrick Ryan
Assistant Examiner—Cathy K. Cam
Attorney, Agent, or Firm—George R. Dohmann

[57] ABSTRACT

A coated material comprising (a) a solid dielectric or semi-conductive substrate which is (b) partially or completely coated on at least one surface with a silicate in which a crystalline charge transfer complex is incorporated.

The material can be used as an antistatic or electrically conductive material, preferably in the form of screens or picture tubes provided with an antistatic finish.

15 Claims, No Drawings 5,554,446

COATED MATERIAL, THE PREPARATION OF USE THEREOF

This is a Divisional of Ser. No. 08/089,137, filed Jul. 9, 1993, now U.S. Pat. No. 5,413,860.

The present invention relates to a coated material comprising (a) a dielectric substrate which is (b) coated on at least one surface partially or completely with a silicate that contains a crystalline and electrically conductive charge transfer complex; to a process for the preparation of said coated material by coating the substrate with a silicate-forming composition containing a charge transfer complex and the subsequently curing the layer so obtained; and to the use of said coated material as an antistatic or electrically conductive material.

The proposal has already been made to use compositions comprising crystalline and electrically conductive charge transfer complexes and an organic binder as coating compositions for providing dielectric materials with an antistatic finish. Illustrative examples are the compositions disclosed in U.S. Pat. No. 5,009,812. The bonding of the layer to the substrate as well as the thermomechanical stability and surface resistance of such materials have been held to be of too low an order for some utilities.

In the Japanese Journal of Applied Physics, Vol. 30, No. 118, pp. 1953–1954 (1991), T. Ohsawa et at. describe silicate-coated glasses, the silicate layer of which contains polycationic poly(2,5-diethoxy)aniline or polypyrrole. The oxidation of the aniline and pyrrole is effected chemically with $FeCl_3$. In the chemical method, unwanted reaction products in the silicate layer which affect the transparency and cause discolourations are unavoidable. These materials are of only limited utility in the an because of the process for their preparation alone. In addition, the electrical conductivities are considered too low, as the spherical polymer particles in the matrix are insulated.

It is also known to provide glasses with electrically conductive layers of metal oxides such as antimony/tin oxide or indium/tin oxide (ATO and ITO glasses). These layer materials have excellent optical, electrical and mechanical properties. However, the layers have to be applied by vapour deposition methods under vacuum and at elevated temperature. These methods are expensive, uneconomic and impractical for coating large parts.

It has now been found that antistatic and electrically conductive silicate layers with excellent adhesion to a substrate are obtained by incorporating crystalline charge transfer complexes in said layers. The layer material can be prepared in simple manner by standard coating methods. The coatings are thermomechanically and chemically stable and they exhibit excellent electrical, mechanical and optical properties, especially excellent scratch resistance, transparency, surface smoothness and electrical conductivity. Compared with silicate layers loaded with polypyrroles or polyanilines, the transparency is substantially enhanced. It is further possible to prepare very thin layers. A particular advantage of the process for the preparation of novel silicate layers resides in the use of charge transfer complexes in aqueous or aqueous organic systems that contain silicate formers such as tetraalkoxy silanes and are easy to handle, which complexes are surprisingly stable to additives such as acids or bases for the hydrolytic formation of the silicate layers.

In one of its aspects, the invention relates to a coated material comprising (a) a solid dielectric or semi-conducting substrate which is (b) partially or completely coated on at least one surface with a silicate in which a crystalline charge transfer complex is incorporated.

Suitable substrates are those that are stable at the curing temperature for forming the silicate layers. The substrates may be unreinforced or reinforced plastics, typically thermosetting plastics, thermoplastics or structurally crosslinked polymers. Illustrative examples are epoxy resins, polyester resins, polyacrylates or polymethacrylates including the copolymers with unsubstituted or substituted olefins (organic glasses), polyamides, polyimides, polyesters, aromatic polysulfones, polyether sulfones and polyethers. Preferred substrates are inorganic materials such as glasses, silicates, metal oxides, metal and semi-metal carbides, metal and semi-metal nitrides, ceramics and semiconductors.

The preferred substrates are glasses. Transparent substrates are preferred and transparent glasses are especially preferred.

The thickness of the silicate layer may typically be from 0.1 to 100 μm, especially from 0.1 to 50 μm, preferably from 0.1 to 20 μm, more preferably from 0.1 to 10 μm, more preferably still from 0.1 to 5 μm and, most preferably, from 0.3 to 3 μm.

By silicate layers are meant those materials which are obtainable by the known sol-gel method. The methods and materials are described, inter alia, in the Japanese Journal of Applied Physics, Vol. 30, No. 118, pp. 1953–1954 (1991). These silicates are network Structures of SiO units which are polycondensates of tetraalkoxysilanes, or network structures containing SiO units, triorgano-SiO units, diorgano-SiO units, P(O)—O units and/or P—O units that are copolycondensates of mixtures of tetraalkoxysilanes with monoorganotrialkoxysilanes and/or diorganodialkoxysilanes and, in some cases, comonomers that form phosphoroxy units. Monomers that form phosphoroxy units are typically phosphites and phosphates carrying $C_1$–$C_6$alkyl, phenyl or benzyl groups, phosphoric acid and polyphosphoric acids. The end groups of the network structures contain alkoxy groups and/or organo groups, the number of which groups depends mainly on the reaction conditions during the polycondensation and on the comonomers. The silicate layer may consist of 50 to 100% molar, preferably 70 to 100% molar and, most preferably, 90 to 100% molar, of tetraalkoxysilanes, and 50 to 0% molar, preferably 30 to 0% molar and, most preferably, 10 to 0% molar, of comonomers. Silicate layers consisting only of tetraalkoxysilanes are most preferred. Alkoxy is preferably butoxy, propoxy and, most preferably, ethoxy or methoxy. Organo groups are typically $C_1$–$C_{12}$alkyl and, preferably, $C_1$–$C_6$alkyl, as well as phenyl and benzyl.

In a preferred embodiment of the novel coated material, at least one surface is completely coated. Partially coated surfaces may be desired if the coated material is to be used as electrode.

The concentration of charge transfer complexes will depend essentially on the intended utility. The layer may typically contain 0.1 to 90% by weight, especially 0.1 to 80% by weight, preferably 0.1 to 70% by weight, more preferably 0. 1 to 50% by weight, still more preferably 0.1 to 40% by weight and, most preferably, from 0.5 to 30% by weight, of a charge transfer complex, and 99.9 to 10% by weight, especially 99.9 to 20% by weight, preferably 99.9 to 30% by weight, more preferably 99.9 to 50% by weight, still more preferably 99.9 to 60% by weight and, most preferably, 99.5 to 70% by weight, of silicate.

At high concentrations of charge transfer complexes, the crystals may rise from the surface but remain covered by the silicate and create a desired roughness for non-reflective surfaces. If smoothness is desired, a further thin silicate layer can be applied.

A host of crystalline and electrically conductive charge transfer complexes, which may also be termed radical cation salts, especially those with monomeric organic cations or metal cations (electron donors) and inorganic or organic anions (electron acceptors), are known and eligible for use in the practice of this invention. The crystal shape can differ and is typically flake-shaped, rod-shaped or needle-shaped. Needle-shaped charge transfer complexes are especially preferred, as they form a network in the matrix, thereby making it possible to obtain high electrical conductivities.

In a preferred embodiment of the novel coated material, the silicate layer contains needle-shaped crystalline charge transfer complexes in the form of a network of the crystal needles in the silicate matrix.

The charge transfer complexes may be represented by the general formula I $$AB_y \qquad (1)$$

wherein A is the cation of an organic electron donor or a metal cation, and B is the anion of an inorganic or organic electron acceptor, and y is a whole number or a fraction from 0.1 to 3, with the proviso that B is an organic electron acceptor if A is a metal cation. The charge transfer complexes may be stoichiometric or non-stoichiometric compositions, depending on the combination of anion and cation. In formula I, y is preferably a number from 0.15 to 2, most preferably from 0.2 to 1.5.

A great number of charge transfer complexes are known and described in the relevant technical literature. Reference is made in this connection, inter alia, to E. Conwell, Semiconductors and Semimetals, Volume 27, pp. 31–85, Academic Press Inc., New York (1990).

Suitable metal cations are typically those of alkali metals and alkaline earth metals, preferably Na and K, as well as of transition metals such as Cu, Ag and Au.

Suitable organic electron donors are typically those of the group of aromatic hydrocarbons such as naphthalene, anthracene, tetracene, pyrene, cyclopentaperylene, terphenyl, quaterphenyl, fluoroanthrene and perylene; N-, O- or S-heterocyclic aromatic compounds containing 1 to 3 identical or different hetero atoms O, S and N, including pyridines, bipyridine, bipyridinamines, pyridazines, pyrazines, pyrimidines, quinolines, isoquinolines, phthalazines, benzopyrazines, acridines, phenazines, dihydrophenazines, benzacridines, phenanthrolines, benzodithiazoles, dibenzofurans, bis(thiopyranylidenes), bis(selenopyranylidenes) or bis(telluropyranylidenes), 2,6-diphenylpymnes, 1,6-dithiapyrene and thiazolines; aminoanilines or N,N-alkylated aminoanilines; aromatic compounds which are di- or tetrachalcogenatcd with S, Se or Te, for example dithio-, diseleno-, ditelluro-, tetrathio-, tetraseleno- and tetratelluronaphthalenes, -anthracenes and -tetracenes; unsubstimted and substituted tetrathio-, tetraseleno- and tetratellurofulvalenes; metallocenes such as cobaltocene, bicobaltocene and ferrocene; metal complexes of phthalocyanines, naphthalocyanines and porphyrines; onium salts such as ammonium, phosphonium, sulfonium and selenium salts, including dimethyl- or diethylmorpholinium iodide, dimethylthiomorpholinium iodide, N-ethylmorpholinium, 4,5-ethylenedithio-3-methylthio- 1,2-dithiolium iodide, methyldiethyl- or ethyldimethyl- or triethylsulfonium iodide, triphenylmethyl- or triphenylethylphosphonium iodide, tetraphenylphosphonium iodide and tetraphenylstibonium iodide. These compounds may be unsubstimted or substituted by $C_1$–$C_6$alkyl, $C_1$–$C_6$alkoxy, $C_1$–$C_6$alkylthio, F, Cl, Br, CN and $NO_2$. Suitable electron acceptor am unsubstimted and substituted 7,7,8,8-tetracyanoquinodimethanes and quinones, including 7,7,8,8-tetracyano-p-quinodimethane, 11,11',12,12'-tetracyano-2,6-naphthoquinodimethane, dicyanoquinodimethane, dicyano-p-benzoquinone and tetrabromodibenzoquinone; unsubstimted and substituted N,N'-dicyanobenzoquinodiimines; chloro-, bromo- and iodanils; tetracyanoethylene and hexacyanobutadiene. Suitable substituents are typically $C_1$–$C_6$alkyl, $C_1$–$C_6$alkoxy, $C_1$–$C_6$-alkylthio, F, Cl, Br, CN and $NO_2$.

Further suitable electron acceptors are mineral acids, oxyacids and complex acids with the anions $F^-$, $Cl^-$, $Br^-$, $I^-$, $CN^-$, $OCN^-$, $SCN^-$, $SeCN^-$, $N_3^-$, $I_3^-$, $I_2Br^-$, $IBr_2^-$, $BrICl^-$, $Br_3^-$, $ICl_2^-$, $CuCl_2^-$, $CuBr_2^-$, $AgCl_2^-$, $AgBr_2^-$, $AgI_2^{31}$, $Ag(CN)_2^-$, $AuCl_2^-$, $AuBr_2^-$, $AuI_2^-$, $Au(CN)_2^-$, $NO_3^{31}$, $C(CN)_3^-$, $ClO_4^-$, $BrO_4^-$, $IO_4^-$, $ReO_4^-$, $FSO_3^-$, $PO_2F_2^-$, $BF_4^-$, $InBr_4^-$, $InI_4^-$, $TlBr_4^-$, $TlI_4^-$, $FeCl_4^-$, $AuCl_4^-$, $AuBr_4^-$, $ICl_4^-$, $SiF_5^-$, $TeF_5^-$, $PF_6^-$, $AsF_6^-$, $SbF_6^-$, $SbCl_6^-$, $NbF_6^-$ or $TaF_6^-$.

Preferred charge transfer complexes used in the practice of this invention are 5,6,11,12-tetrathio- or -tetraselenotetracenehalides or -cuprohalides, for example (5,6,11,12-tetrathiotetracene)$_2$Cl, (5,6,11,12-tetrathiotetracene)$_2$Br, (5,6,11,12-tetrathiotetracene)$_2$I$_3$, 5,6,11,12-tetrathiotetracene(CuCl$_2$)$_{0.4-0.48}$, (5,6,11,12-tetraselenotetra)$_2$Cl, (5,6,11,12-tetraselenotetracene)$_2$Br, 5,6,11,12-tetraselenotetracene(CuCl$_2$)$_{0.4-0.48}$ and (2-fluoro-5,6,11,12-tetrathiotetracene)$_2$Cl.

In another of its aspects, the invention relates to a process for the preparation of the novel coated material, which comprises (a) coating at least one surface of a solid dielectric substrate partially or completely with a silicate-forming composition in which a charge transfer complex is dissolved or dispersed, (b) drying the layer so obtained, and (c) curing the dried layer at elevated temperature.

Coating can be effected by per se known techniques, typically by brushing, casting, doctor coating, spin-coating or spraying. Spraying is preferred for applying dispered charge transfer complexes, as coatings having isotropic poperties can be obtained.

The charge transfer complexes should be inert to the reaction medium so that their properties are not altered. Charge transfer complexes are usually stable to the chemicals used here. The amount of charge transfer complex has been mentioned previously in connection with the coated material.

The silicate-forming composition comprises, in addition to the charge transfer complexes and the silicate-forming monomers and optional comonomers, an acid or base and water for the polycondensafion. Suitable acids are mineral acids such as hydrochloric acid, sulfuric acid, perchloric acid or phosphoric acid. Suitable bases are typically alkali metal or alkaline earth metal bases [NaOH, KOH, Ca(OH)$_2$] or alkali metal or alkaline earth metal carbonates (NaHCO$_3$, KHCO$_3$, Na$_2$CO$_3$ and K$_2$CO$_3$). Silicate-forming compositions are known and described, inter alia, in the reprint distributed by Allied Signal Inc., South Milpitas, Calif., from Microelectronic Manufacturing and Testing, Lake Publishing Corporation, Libertyville, Ill., USA (April 1989). The compositions are also termed sol-gel solutions and are commercially available. The amount of silicate-forming monomers may typically be from 10 to 60% by weight, preferably from 20 to 50% by weight, based on the solgel solution.

The compositions conveniently contain a water-miscible polar and preferably protic solvent, typically an alkanol, to obtain a homogeneous and readily processable reaction mass. Suitable alkanols are those that evaporate readily on drying, typically butanols, propanols, ethanol and methanol. Other suitable solvents are ketones such as acetone and ethers such as diethyl ether.

It is possible to use insoluble as well as soluble charge transfer complexes in the reaction medium. When using soluble complexes, is convenient to add as well an inert polar and preferably aprotic solvent in which the complex is soluble. The solvents may be used alone or as a mixture of at least two solvents. Examples are: ethers such as dibutyl ether, tetrahydrofuran, dioxane, methylene glycol, dimethyl ethylene glycol, dimethyl diethylene glycol, diethyl diethylene glycol, dimethyl tdethylene glycol, halogenated hydrocarbons such as methylene chloride, chloroform, 1,2-dichloroethane, 1,1,1-trichloroethane, 1,1,2,2-tetrachloroethane, carboxamides and lactams such as N,N-dimethylfonmmide, N,N-diethylformamide, N,N-dimethylacetamide, N,N-diethylacetamide, N-methyl-γ-butyrolactam, N-methyle-caprolactam, N-methylpyrrolidone, N-acetylpyrrolidone, tetramethylurea, hexamethylphosphoric triamide, sulfoxides such as dimethyl sulfoxide, sulfones such as dimethyl sulfone, diethyl sulfone, trimethylene sulfone, tetramethylene sulfone, N-methylpyrrolidine, N-methylpiperidine, N-methylmorpholine, substituted benzenes such as benzonitrile, chlorobenzene, o-dichlorobenzene, 1,2,4-trichlorobenzene, nitrobenzene, anisole, ketones such as acetone, methyl isobutyl ketone. It is also possible to use nonpolar solvents such as hydrocarbons (hexane, cyclohexane, methyl cyclohexane, benzene, toluene and xylene. Dissolved charge transfer complexes usually crystallise upon drying. The composition can contain further processing assistants, including surfactants, dispersants, pH buffers, viscosity enhancers, bonding agents and flow control agents. It may also contain chromophoric components. Surfactants are usually added in an amount of 0.01 to 3% by weight, based on the coating system. The charge transfer complexes may be present in the coating system (solvent, acid or base and silicate-forming compound) in an amount of typically 10 to 60% by weight, more preferably 25 to 50% by weight. The coated layer is conveniently dried at room temperature and preferably under vacuum, e.g. $10^6$ to $10^9$ Pa or $10^8$ to $10^9$ Pa. The cure is carded out at temperatures from 50° C., typically in the range from 50° to 200° C., more preferably from 80° to 200° C. The cure can also be effected under vacuum. Specifically, the process is carried out by mixing the silicate-forming composition with optional processing assistants and then dispersing the charge transfer complex therein, or mixing the composition with a solution of a charge transfer complex. The substrate is then coated, the coated material is dried, and afterwards the layer is dried at elevated temperature.

A particularly preferred embodiment of the novel process comprises (a) coating at least one surface of the substrate with a composition comprising tetramethoxysilane or tetraethoxysilane, a dispersed needie-shaped crystalline charge transfer complex, a surfactant, dilute hydrocbdoric acid, water and a $C_1$–$C_4$alkanol, (b) drying the layer at room temperature without or under vacuum, and (c) curing the dried layer in the temperature range from 100° to 200° C. The coated material of this invention has excellent electrical, optical and thermomechanical properties and excellent mechanical surface properties. Depending on the intrinsic conductivity of the charge transfer complexes and their crystal content, excellent electrical properties can surprisingly be achieved even at low loadings, for example 0.5 to 5% by weight. The material can be opaque to transparent, depending on the loading and the type of substrate. The surface hardness and smoothness is excellent. The layers additionally exhibit superior scratch resistance and bonding strength. The novel coated material may typically be bodies of any shape which are provided with an antistatic finish. Owing to the low surface resistance, a surprisingly rapid conductive discharge can be achieved. The novel coated material can also be used as electrical conductor, conveniently as electrode material. In another of its aspects, the invention relates to the use of the novel coated material as antistatic or electrically conductive material. The novel process can be used in particular for the preparation of transparent, antistatic and scratch resistant coatings on screens. In yet another of its aspects, the invention relates to a screen or picture tube of glass coated with a thin and transparent layer of silicate in which at least one crystalline charge transfer complex is incorporated. The thickness of the layer is preferably 0.3 to 10 μm and the content of charge transfer complex is preferably 0.5 to 30% by weight and, most preferably, 0.5 to 5% by weight, based on the silicate layer. It is especially advantageous that the picture screen can be coated direct and that the antistatic finish is not effected with an attachment. It is also advantageous that the picture tube can be coated without vacuum and at relatively low temperature.

The following Examples illustrate the invention in more detail.

EXAMPLE 1

30 mg of (5,6,11,12-tetraselenotetracene)$_2$chloride in the form of crystal needles are dispersed in a mixture of 2 g of polyvinyl alcohol solution (2% in water), 30 μl of an additive solution (polyurethane oligomer dissolved in anisole/xylene) and 3 g of a sol-gel solution of 20 parts by weight of tetramethoxysilane, 2 parts by weight of 1 N HCl, 43 parts by weight of water, 103 parts by weight of ethanol, and 35 parts by weight of polvinyl alcohol solution (2% in water). Layers having a wet film thickness of c. 24 μm are prepared by doctor coating. The layers are first dried at room temperature and then at 130° C. and cured to give transparent conductive layers. The surface resistance is 300 kOhm/cm$^2$, the hardness is 6H (i.e. the layer is not scratched by a pencil having a hardness of 6H).

EXAMPLE 2

To 1 g of a sol-gel solution of 10 parts by weight of tetramethoxysilane, 1 part by weight of 1 N HCl, 6 parts by weight of water, 10 parts by weight of ethanol and 4 parts by weight of polyvinyl alcohol solution (2% in water) are added 4 g of a solution, saturated at room temperature, of the charge transfer complex of N-isoamyl isoquinoline and 7,7,8,8-tetracyanoquinodimetane (TCNQ) in acetone which is described in EP-A-0 224 207. A glass plate (10×10 cm) is spin-coated with 0.7 ml of the green solution at a velocity of 400 min$^{-1}$. The layer is cured first at room temperature and afterwards at 100° C./0.1 mbar for about 2 min, giving transparent conductive layers. The surface resistance is 3.5×10$^8$ Ohm/cm$^2$.

EXAMPLE 3

To 1 g of a sol-gel solution of 10 parts by weight of tetraethoxysilane, 0.6 part by weight of 1 N HCl, 10 parts by weight of water, 10 parts by weight of ethanol and 4 parts by weight of a polyvinyl alcohol solution (2% in water) are added 3 g of a solution, saturated at room temperature, of the charge transfer complex of Example 2 in acetone. A glass plate (10×10 cm) is spin-coated with 0.7 ml of the green solution at a velocity of 400 min$^{-1}$. The layer is cured first at room temperature and afterwards at 100° C./0.1 mbar for about 2 min, giving transparent conductive layers. The surface resistance is $4 \times 10^7$ Ohm/cm$^2$.

EXAMPLE 4

To 1.93 g of a sol-gel solution of 10 parts by weight of tetramethoxysilane, 1 part by weight of 1 N HCl, 8 parts by weight of water and 12 parts by weight of ethanol are added 3.07 g of water, 5.75 g of ethanol, 500 μl of a 10% ethanolic solution of an ethoxylated octadecanol as surfactant. This mixture is dispersed for 20 minutes at 5000 rpm (dispersing apparatus: Polytron Kinematica). A glass plate (10×10 cm) is spin-coated with about 1.3 ml of the suspension at a velocity of 700 min$^{-1}$. The layer is cured first at room temperature and afterwards at 150° C./0.1 mbar for about 2 min, giving transparent conductive layers. The surface resistance is $3 \times 10^4$ Ohm/cm$^2$.

What is claimed is:

1. A coated material comprising (a) a solid dielectric or semi-conductive substrate which is (b) partially or completely coated on at least one surface with a silicate in which a crystalline charge transfer complex is incorporated.

2. A screen or picture tube which comprises glass coated with a thin and transparent silicate layer in which at least one crystalline charge transfer complex in the form of a network of crystal needles is incorporated.

3. A screen or picture tube as claimed in claim 2, wherein the thickness of the silicate layer is 0.3 to 10 μm.

4. A screen or picture tube as claimed in claim 3, wherein the silicate layer contains 0.5 to 25% by weight of at least one charge transfer complex, based on said silicate layer.

5. A screen or picture tube according to claim 2, wherein the silicate layer is a polycondensate of tetraalkoxysilanes.

6. A screen or picture tube according to claim 5, wherein alkoxy is methoxy or ethoxy.

7. A screen or picture tube according to claim 2, wherein the charge transfer complex has the formula I $$AB_y \qquad (I)$$

wherein A is the cation of an organic electron donor or a metal cation, and B is the anion of an inorganic or organic electron acceptor, and y is a whole number or a fraction from 0.1 to 3, with the proviso that B is an organic electron acceptor if A is a metal cation.

8. A screen or picture tube according to claim 7, wherein the charge transfer complex is a 5,6,11,12-tetrathio- or 5,6,11,12-tetraselenotetracenehalide-cuprohalide.

9. A screen or picture tube according to claim 8, wherein the charge transfer complex is selected from the group consisting of (5,6,11,12-tetrathiotetracene)$_2$Cl, (5,6,11,12-tetrathiotetracene)$_2$Br, (5,6,11,12-tetrathiotetracene)$_2$I$_3$, 5,6,11,12-tetrathiotetracene(CuCl$_2$)$_{0,4-0,48}$, (5,6,11,12-tetraselenotetracene)$_2$Cl, (5,6,11,12-tetraselenotetracene)$_2$Br, 5,6,11,12-tetraselenotetracene (CuCl$_2$)$_{0,4-0,48}$ and (2-fluoro-5,6,11,12-tetrathiotetracene)$_2$Cl.

10. A screen or picture tube according to claim 4, wherein the charge transfer complex is a 5,6,11,12-tetrathio- or 5,6,11,12-tetraselenotetracenehalide-cuprohalide.

11. A screen or picture tube according to claim 10, wherein the charge transfer complex is selected from the group consisting of (5,6,11,12-tetrathiotetracene)$_2$Cl, (5,6,11,12-tetrathiotetracene)$_2$Br, (5,6,11,12-tetrathiotetracene)$_2$I$_3$, 5,6,11,12-tetrathiotetracene-(CuCl$_2$)$_{0,4-0,48}$, (5,6,11,12-tetraselenotetracene)$_2$Cl, (5,6,11,12-tetraselenotetracene)$_2$Br, 5,6,11,12-tetraselenotetracene-(CuCl$_2$)$_{0,4-0,48}$ and (2-fluoro-5,6,11,12-tetrathiotetracene)$_2$Cl.

12. A screen or picture tube according to claim 10, wherein the silicate layer is a polycondensate of tetraalkoxy silanes.

13. A screen or picture tube according to claim 12, wherein alkoxy is methoxy or ethoxy.

14. A screen or picture tube according to claim 11, wherein the silicate layer is a polycondensate of tetraalkoxysilanes.

15. A screen or picture tube according to claim 14, wherein alkoxy is methoxy or ethoxy.

* * * * *